(12) United States Patent
Or et al.

(10) Patent No.: US 12,198,027 B1
(45) Date of Patent: Jan. 14, 2025

(54) AUTOMATED ALIGNMENT OF INERTIAL SENSORS IN VEHICLES

(71) Applicant: ALMA Technologies Ltd., Haifa (IL)

(72) Inventors: Barak Or, Haifa (IL); Maxim Freydin, Haifa (IL); Nimrod Segol, Tel Aviv (IL)

(73) Assignee: ALMA Technologies Ltd., Malfa (IL)

( * ) Notice: Subject to any disclaimer, the term of this patent is extended or adjusted under 35 U.S.C. 154(b) by 0 days.

(21) Appl. No.: 18/382,513

(22) Filed: Oct. 22, 2023

(51) Int. Cl.
*G06N 20/00* (2019.01)
*G01C 21/16* (2006.01)

(52) U.S. Cl.
CPC ............. *G06N 20/00* (2019.01); *G01C 21/16* (2013.01)

(58) Field of Classification Search
CPC ................................. G06N 20/00; G01C 21/16
See application file for complete search history.

(56) References Cited

U.S. PATENT DOCUMENTS

| | | | |
|---|---|---|---|
| 9,448,250 B2 * | 9/2016 | Pham | G01C 21/26 |
| 9,599,633 B2 | 3/2017 | McKown | |
| 9,891,054 B2 | 2/2018 | Czompo et al. | |
| 2015/0006099 A1 | 1/2015 | Pham | |

OTHER PUBLICATIONS

Enrico Bassetti, A Luciani, EPanizzi, "ML-based re-orientation of smartphone-collected car motion data", Procedia Computer Science, vol. 198, 2022, pp. 237-242, ISSN 1877-0509, https://doi.org/10.1016/j.procs.2021.12.234. (htttps://www.sciencedirect.com/science/article/pii/S187705092102473X) (Year: 2022).*
Bassetti et al. "ML-based Re-orientation of Smartphone-collected Car Motion Data", Science Direct, Procedia Computer Science, 198: 237-242, 2022.
Kang et al. "Practical Driving Analytics with Smartphone Sensors" in 2017 IEEE Vehicular Networking Conference (VNC), Feb. 1, 2018.

* cited by examiner

*Primary Examiner* — Tarek Elarabi (57) ABSTRACT

A method of training Machine Learning (ML) models for aligning inertial data captured by inertial sensors located in dynamic vehicles, comprising receiving inertial data recorded in a plurality of trips of vehicles using inertial sensors placed in the vehicles in one or more predefined orientations with respect to the vehicles, segmenting each of the trips to trip segments, creating labeled training samples each comprising a time-series vector comprising inertial data samples recorded during a time window of a respective trip segment and associated with a label reflecting the predefined orientation of the inertial sensors, training one or more ML models using the labeled training samples to estimate orientation of inertial sensors with respect to vehicles, and outputting the trained ML model(s) for estimating orientation of inertial sensors placed in vehicles with respect to the vehicles for aligning their captured inertial data with respect to the vehicles.

14 Claims, 5 Drawing Sheets

AUTOMATED ALIGNMENT OF INERTIAL SENSORS IN VEHICLES

FIELD AND BACKGROUND OF THE INVENTION

The present invention, in some embodiments thereof, relates to aligning inertial data captured by sensors located in vehicles, and, more specifically, but not exclusively, to using Machine Learning (ML) for automatically aligning inertial data captured by sensors located in vehicles with the vehicle's coordinate system.

As the automotive industry constantly advances, sensory data in general and inertial data in particular may be highly useful for a plurality of applications relating to vehicles, for example, automated driving systems, autonomous driving systems, navigation systems, maintenance systems and services, and/or the like.

SUMMARY OF THE INVENTION

According to a first aspect of the present invention there is provided a method of training machine learning (ML) models for aligning inertial data captured by inertial sensors located in dynamic vehicles, comprising using one or more processors for:
  Receiving inertial data recorded in a plurality of trips of one or more vehicles. The inertial data is recorded using one or more inertial sensors placed in the one or more vehicles in one or more predefined orientations with respect to the one or more vehicles.
  Segmenting each of the plurality of trips to a plurality of trip segments.
  Creating a training dataset comprising a plurality of labeled training samples. Each of the plurality of labeled training samples is a time-series vector comprising a plurality of inertial data samples recorded during a time window of a respective one of the plurality of trip segments and associated with a label reflecting the one or more predefined orientations of the one or more inertial sensors in the respective trip segment.
  Training one or more ML models using the plurality of labeled training samples to estimate orientation of one or more inertial sensors with respect to one or more vehicles.
  Outputting the one or more trained ML models for estimating orientation of one or more inertial sensors placed in one or more vehicles with respect to the one or more vehicles for aligning inertial data captured by the one or more inertial sensors with respect to the one or more vehicles.

According to a second aspect of the present invention there is provided a system for training machine learning models for aligning inertial data captured by sensors located in dynamic vehicles, comprising one or more processors executing a code, the code comprising:
  Code instructions to receive inertial data recorded in a plurality of trips of one or more vehicles. The inertial data is recorded using one or more inertial sensors placed in the one or more vehicles in one or more predefined orientations with respect to the respective one or more vehicles.
  Code instructions to segment each of the plurality of trips to a plurality of trip segments each corresponding to a respective one of a plurality of time windows.
  Code instructions to create a training dataset comprising a plurality of labeled training samples. Each of the plurality of labeled training samples is a time-series vector comprising a plurality of inertial data samples recorded during a time window of a respective one of the plurality of trip segments and associated with a label reflecting the respective predefined orientation of the one or more inertial sensor in the respective trip segment.
  Code instructions to train one or more ML models using the plurality of labeled training samples to estimate orientation of one or more inertial sensors with respect to the respective one or more vehicle.
  Code instructions to output the one or more trained ML models for estimating orientation of one or more inertial sensors placed in one or more vehicles with respect to the respective one or more vehicle for aligning inertial data captured by the one or more inertial sensors with respect to the respective one or more vehicle.

According to a third aspect of the present invention there is provided a method of using machine learning (ML) models to align orientation of inertial data sensors captured by sensors located in dynamic vehicles, comprising using one or more processors for:
  Receiving inertial data captured by one or more inertial sensors placed in a vehicle.
  Applying one or more trained ML models to the inertial data in order to estimate orientation of the one or more inertial sensors with respect to the vehicle.
  Adjusting, automatically in real-time, the inertial data according to the estimated orientation of the one or more inertial sensors.
  Outputting the adjusted inertial data to one or more systems adapted to use the adjusted inertial data for one or more vehicular applications relating to the vehicle.

In a further implementation form of the first, second, and/or third aspects, the orientation of the one or more inertial sensors with respect to the one or more vehicles is defined with respect to a reference coordinate system of the respective vehicles.

In a further implementation form of the first, second, and/or third aspects, the inertial data is rotated to align one or more axes of a reference coordinate system of the one or more sensors with the gravity force vector.

In a further implementation form of the first, second, and/or third aspects, at least part of the inertial data is pre-processed to adjust one or more signal parameters of one or more of a plurality of inertial signals included in the inertial data.

In an optional implementation form of the first, second, and/or third aspects, the one or more inertial sensors are integrated in one or more devices located in the vehicle. The one or more devices are members of a group consisting of: a mobile device associated with one or more user located in the vehicle, a vehicular system, an IoT device, and/or a monitoring device.

In a further implementation form of the first, and/or second aspects, the one or more predefined orientations of one or more inertial sensors further comprises a position of the one or more inertial sensors with respect to one or more reference points of the one or more vehicles.

In a further implementation form of the first, and/or second aspects, the one or more predefined orientations of one or more inertial sensors further comprises a mounting arrangement of the one or more inertial sensors in the one or more vehicles.

In a further implementation form of the first, and/or second aspects, each of the plurality of trips is a member of a group consisting of: a real trip conducted by one or more of the vehicles, a simulated trip simulated for one or more of the vehicles, and a simulated trip simulated for one or more of the inertial sensors.

In an optional implementation form of the first, and/or second aspects, one or more augmented training samples are crated to enhance the training dataset by:

Computing a rotation matrix for one or more of the plurality of training samples with respect to the one or more vehicles according to the one or more predefined orientations extracted from the label of the respective training samples.

Multiplying the time-series vector of the respective training sample by the rotation matrix to create one or more respective aligned training samples aligned with respect to the one or more vehicles.

Creating one or more augmented training samples by multiplying one or more of the aligned training samples by one or more emulated orientation angles to create one or more augmented training samples, and associating each of the one or more augmented training samples with a label reflecting the respective emulated orientation angle.

Including the one or more augmented training samples in the training dataset to enhance the training dataset.

Using the enhanced training dataset for further training the one or more ML models.

In a further implementation form of the first, and/or second aspects, each of the one or more emulated orientation angles comprises one or more of: a pitch angle, a roll angle, and a yaw angle, one or more of the pitch angle, the roll angle, and/or the yaw angle is randomly selected from a respective predefined range.

In a further implementation form of the first, and/or second aspects, one or more of the pitch angle, the roll angle, and/or the yaw angle are randomly selected from the respective predefined range according to a uniform probability distribution.

In a further implementation form of the first, and/or second aspects, the plurality of labeled training samples are split into a train set, a validation set, and a test set sets each comprising an exclusive group of labeled training samples selected from the plurality of labeled training samples.

In an optional implementation form of the third aspect, the inertial data is dynamically adjusted according to an estimated new orientation of the one or more inertial sensors with respect to the orientation of the vehicle responsive to detection of a change in the orientation of the one or more inertial sensor.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to aligning inertial data captured by sensors located in vehicles, and, more specifically, but not exclusively, to using ML for automatically aligning inertial data captured by sensors located in vehicles with the vehicle's coordinate system.

With the rapid advancement of mobile devices, for example, mobile phones, wearable devices such as, for example, Smart watches, Smart goggles, and/or the like, their sensing capabilities as well as connectivity channels constantly improve and expand in functionality, performance, and scope.

The sensing capabilities of such mobile devices held, carried, worn, and/or otherwise physically associated with users driving, riding, and/or travelling in vehicles (e.g., drivers, passengers, commuters, etc.) may be therefore highly valuable for one or more applications relating to the vehicles in which the users travel.

In particular, inertial sensory data captured by one or more inertial sensors of the mobile devices, for example, an accelerometer, a gyroscope, a magnetometer, an Inertial Measurement Unit (IMU), and/or the like may be used by one or more systems, services, and/or platforms relating to the vehicles in which the mobile devices are located, placed, and/or carried (by users).

However, since the mobile devices, and hence their integrated sensors, are independent of the vehicles in which they are located, the sensory data captured by these sensors is referenced to a coordinate system of the sensors which is typically unaligned with a reference coordinate system of the vehicle in which they are located.

This limitation may prevent effectively using the inertial data captured by the independent inertial sensors for one or more applications relating to the vehicles, for example, an automated driving system, a navigation system, a maintenance system, a driver behavior recognition system, and/or the like.

The term mobile device as used herein may further include, in addition to mobile devices associated with users, mobile devices which are not necessarily associated with users but may be rather placed in vehicles in a non-fixed and/or built-in installation. For example, an Internet of Things (IoT) device may be located, deployed, and/or placed in a vehicle in a non-rigid mounting mode, at least not according to known mounting attributes, such that it is independent from the vehicle and unaligned with it.

According to some embodiments of the present invention, there are provided methods, systems and computer program products for aligning inertial data captured by inertial sensors placed, and/or located in vehicles with the vehicle's coordinate system, specifically inertial sensors which are independent of the vehicles and thus unaligned with the vehicles.

Such vehicle may typically include ground vehicles such as, for example, a car, a truck, a bus, a train, a motorcycle, a bicycle, and/or the like. However, the vehicles may further include one or more aerial vehicles, and/or naval vehicles.

Aligning the inertial data captured by independent inertial sensors is done based on estimation of an orientation of the inertial sensor with respect to the vehicle in which the inertial sensor is located. in particular, one or more ML models trained to estimate the orientation of the inertial sensor with respect to the vehicle based on the inertial data (samples) captured by the sensor. The orientation may be expressed in one or more orientation angles, for example, yaw, pitch, and roll.

The ML model(s), for example, a neural network, a Support Vector Machine (SVM), a classifier, a statistical classifier, a linear regression based model, a random forest of regression models, and/or the like may be trained in one or more training sessions, specifically supervised training sessions, using one or more training datasets comprising a plurality of annotated (labeled) training samples comprising inertial data captured by one or more sensors during one or more trips of one or more vehicles.

Each trip, which may be a real trip of a real vehicle and/or a simulated trip simulated for one or more vehicle, may be segmented to a plurality of trip segments and a plurality of time-series vectors may be created, each comprising a plurality of inertial data samples captured by one or more inertial sensors during a respective time window corresponding to one of the plurality of trip segments.

Each of the training samples may therefore comprise a respective time-series vector associated with a label indicative of the orientation of the inertial sensor(s) which captured the inertial data samples of the respective time-series vector with respect to the vehicle in which the inertial sensor(s) are located.

Optionally, one or more augmented training samples may be created by augmenting one or more of the captured and/or simulated training samples.

One or more training samples may be first aligned, i.e., the inertial data samples of their time-series vectors may be aligned with the coordinate system of the respective vehicle(s). Each aligned training samples may be then multiplied by one or more rotation matrices representing one or more emulated orientation angles to produce one or more respective augmented training samples each oriented with respect to the coordinate system of the respective vehicle(s) by the respective emulated orientation angle.

The emulated orientation angles may be selected from one or more ranges according to one or more desired installation and/or mounting modes of inertial sensors in vehicles.

The augmented training samples may be then added to enhance the training dataset.

Using the training dataset, the trained ML model(s) may be trained to estimate, in real-time, the orientation of one or more inertial sensors located in one or more vehicles with respect to the vehicles.

The trained ML model(s) may be used to align the inertial data captured by the inertial sensors with the coordinate system of the vehicles based on the estimated orientation thus enabling efficient use of the inertial data captured by the independent inertial sensors for one or more applications relating to the vehicles.

Using ML model(s) to align inertial data captured by inertial sensors independent and unaligned with vehicles in which they are located with a reference coordinate system of the vehicles may present significant benefits and advantages.

First, using inertial data captured by inertial sensors of mobile devices and thus not inherently available to applications relating to the vehicle may significantly improve performance of such applications, in terms, of accuracy, reliability, integrity, and/or the like since the inertial data captured by the independent inertial sensor(s) may efficiently compliment inertial data capture by inherent inertial sensors of the vehicle. This advantage may be significantly more dramatic for vehicle which lack and/or have limited inherent inertial sensing capabilities. Moreover, the capabilities and/or performance of inertial sensors integrated in modern mobile devices is highly advanced and rapidly improving thus significantly increasing accuracy, reliability, consistency, and/or the like of their captured inertial data. using this increased accuracy inertial data which may possibly surpass the inertial data capture by vehicles' inherent inertial sensors may further improve performance of the vehicle related applications.

Moreover, with the constantly advancing ML technology, using ML models to estimate the orientation of the independent sensors with respect to the vehicle may significantly improve accuracy of the estimated orientation compared to existing methods.

Furthermore, creating a plurality of augmented training samples may significantly enhance the training dataset used to train the ML model(s) which may significantly improve performance of the ML model(s), for example, accuracy, consistency, reliability, and/or the like and/or reduce computation time, computation resources, and/or the like. First, the number of training samples which may be produced based on captured and/or simulated inertial data may be limited. Producing additional augmented training samples may therefore significantly increase the number of training samples used to train the ML model(s) thus improving performance of the ML model(s). Moreover, the captured and/or simulated inertial data may be limited to trips which are actually conducted and that can be physically conducted thus limiting the use case base to only the trips which were actually travelled and/or simulated. Enhancing the training dataset to include use cases which were not actually travelled and/or simulated and/or are impossible to conduct, and training the ML model(s) with the enhance training dataset may further improve performance of the ML model(s).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external comsgmentputer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
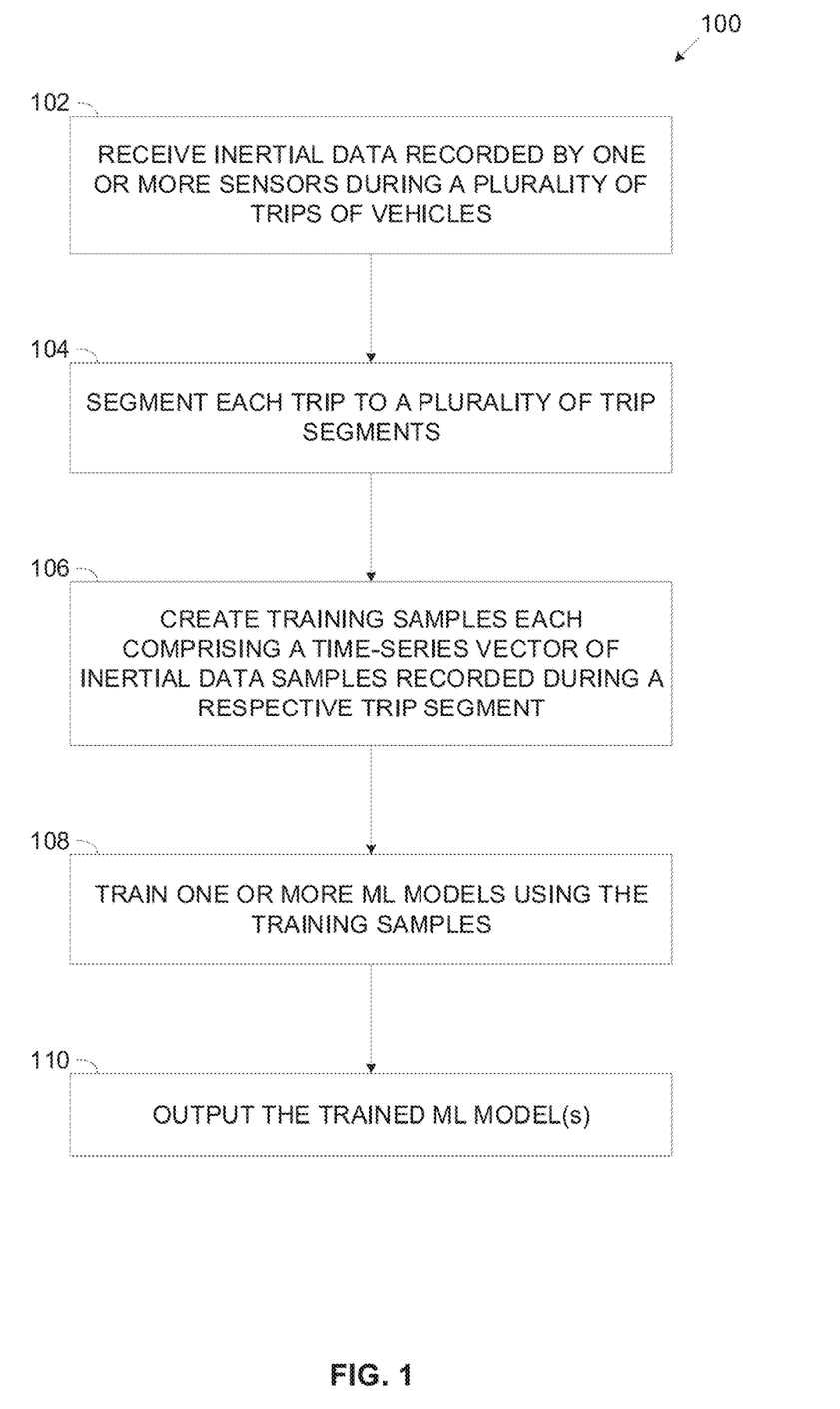
FIG. 1 is a flowchart of an exemplary process of training one or more ML models to align inertial data captured by sensors placed in a vehicle with the vehicle's coordinate system, according to some embodiments of the present invention.

Referring now to the drawings, FIG. 1 is a flowchart of an exemplary process of training one or more ML models to align inertial data captured by sensors placed in a vehicle with the vehicle's coordinate system, according to some embodiments of the present invention.

An exemplary process 100 may be executed to train one or more ML models to estimate orientation of one or more sensors, specifically inertial sensors located in one or more vehicles with respect to the respective vehicle in order to align inertial data captured by the inertial sensors with the respective vehicle, specifically with a coordinate system of the respective vehicle.

In particular, the ML model(s) may be trained to estimate the orientation of the inertial sensor(s) with respect to the vehicle based on the inertial data captured by the inertial sensor(s).

The inertial sensor(s) may be independent of the vehicle, for example, integrated in one or more mobile devices and may be therefore placed, mounted, and/or deployed in the vehicle at an arbitrary angle with respect to the vehicle such that their orientation is typically unaligned with the vehicle. The mobile devices may include, for example, one or more mobile devices associated with users in the vehicle (e.g., driver, passenger), for example, a Smartphone, a Smart watch, an wearable device, and/or the like held, carried, worn, and/or the like by the user(s). In another example, the mobile device may include mobile devices which are not necessarily associated with users but may be rather placed, mounted, and/or deployed in vehicles in a non-fixed and/or built-in installation, for example, an IoT device, a vehicular system, a monitoring device, and/or the like which is deployed and/or mounted in an arbitrary location and/or orientation.

Therefore, by estimating the orientation of independent inertial sensor(s) placed, located, deployed, and/or the like in one or more vehicles with respect to the respective vehicle, the inertial data captured by the inertial sensor(s) may be oriented with respect to the vehicle and used for one or more applications relating to the vehicle, for example, an automated driving system, a navigation system, a maintenance system, a driver behavior recognition, and/or the like.

Figure 2:
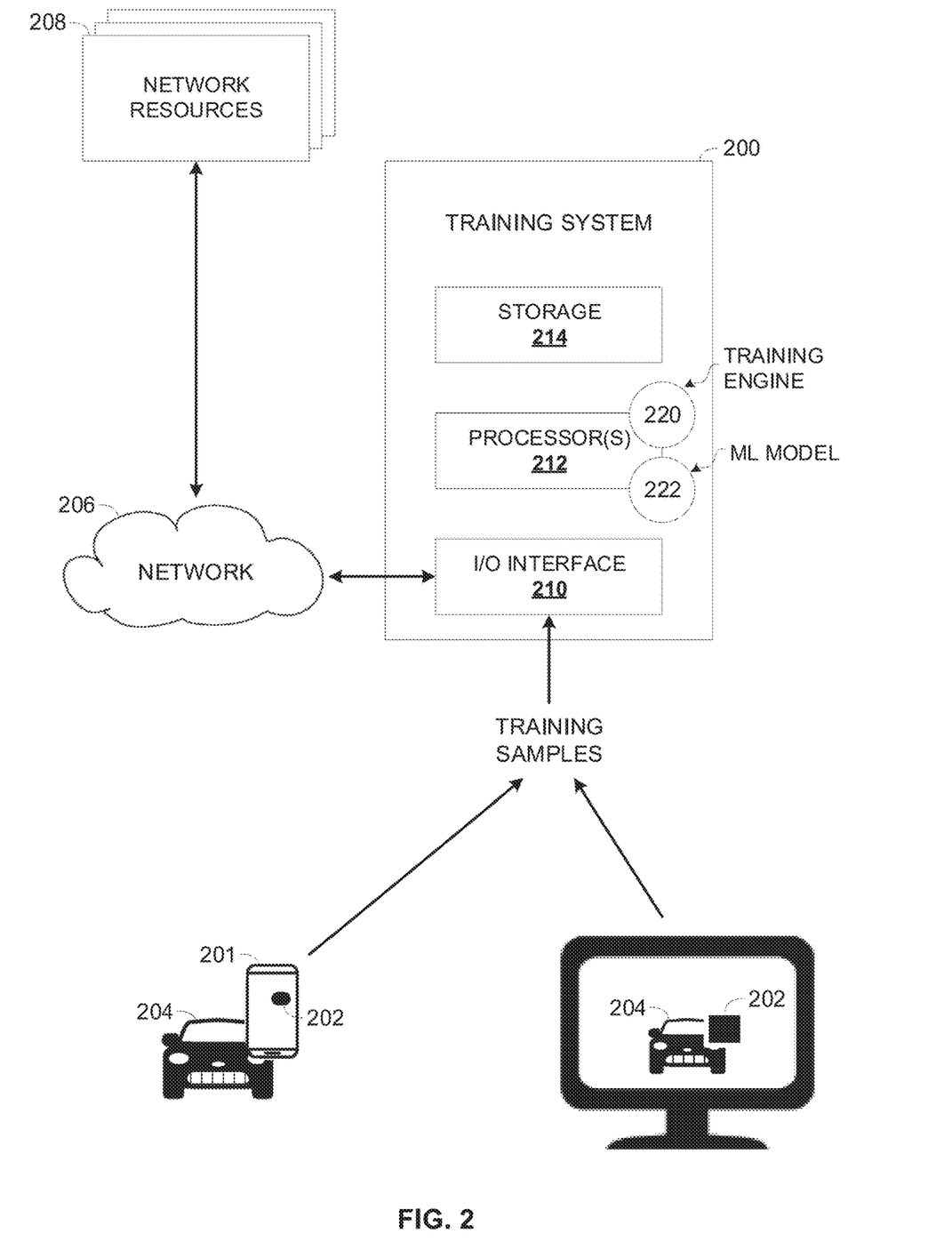
FIG. 2 is a schematic illustration of an exemplary system for training one or more ML models to align inertial data captured by sensors placed in a vehicle with the vehicle's coordinate system, according to some embodiments of the present invention.

Reference is also made to FIG. 2, which is a schematic illustration of an exemplary system for training one or more ML models to align inertial data captured by inertial sensors placed in a vehicle with the vehicle's coordinate system, according to some embodiments of the present invention.

An exemplary training system 200 may execute the process 100 for training one or more ML models 222 to estimate the orientation of one or more inertial sensors 202 located in one or more vehicles 204 with respect to the vehicle(s) 204. The ML models 222 may include, for example, a Neural Network (NN), a Convolutional Neural Network (CNN), a Long short-term memory (LSTM) neural network, a Deep Neural Network (DNN), an SVM, a classifier, a statistical classifier, a linear regression based model, a random forest of regression models, and/or the like as well as a combination of two or more ML models.

The inertial sensor(s) 202 may be typically integrated in one or more mobile devices 201, for example, a mobile device associated with a user located in the vehicle, for example, a driver, a passenger, a commuter, and/or the like. In another example, the mobile device(s) 201 may comprise one or more mobile device which are not necessarily associated with users but are also independent of the vehicle 204, for example, an IoT device, a vehicular system, a monitoring device, and/or the like which is deployed and/or mounted in an arbitrary location and/or orientation.

The training system 200, for example, a server, a processing node, a cluster of processing nodes, and/or the like may comprise an Input/Output (I/O) interface 210, a processor(s) 212 for executing the process 100, and a storage 214 for storing data and/or code (program store).

The I/O interface 210 may include one or more wired and/or wireless I/O interfaces, for example, a Universal Serial Bus (USB) port, a serial port, a Bluetooth (BT) interface, a Radio Frequency (RF) interface, and/or the like for communicating and/or attaching to one or more external devices and/or attachable devices.

The I/O interface 210 may further include one or more network adapters, interfaces, ports, and/or links for connecting to a network 206 comprising one or more wired and/or wireless networks, for example, a Local Area Network (LAN), a Wireless LAN (WLAN, e.g. Wi-Fi), a Wide Area Network (WAN), a Metropolitan Area Network (MAN), a cellular network, the internet and/or the like.

The inertial sensors 202 may comprise, for example, an accelerometer, a gyroscope, a magnetometer, an IMU, and/or the like. In particular, the inertial sensor(s) 202 may include sensors which are typically available in one or more mobile devices used by users (e.g., driver, passenger, commuter, etc.) which may travel in the vehicles 204, for example, a car, a truck, a bus, a motorcycle, a bicycle, and/or the like.

This means that the inertial sensors 202 may be independent of the vehicle 204 in which they are placed meaning that they are not aligned with the vehicle 204, i.e., the coordinate system of the inertial sensor(s) 202 is not aligned with the coordinate system of the vehicle 204 in which it is located (deployed).

It should be noted that while the vehicles 204 may be typically ground vehicles, embodiments described herein may be expanded, using the same systems and methods, for estimating orientation of inertial sensors 202 located in one or more other vehicles 204, for example, aerial vehicles, naval vehicles, and/or the like.

One or more of the inertial sensors 202 may be real sensors located, for example, deployed, placed, mounted, and/or the like in one or more real vehicles 204 and may thus record and/or capture inertial data during one or more trips (driving sessions) of the real vehicle(s) 204. In another example, one or more of the inertial sensor(s) 202 may be simulated using one or more simulation tools, software applications, services, and/or the like adapted to simulate trips for one or more vehicles 204. In such embodiments, the inertial data may be simulated for one or more inertial sensor(s) 202 deployed in simulated vehicle(s) 204 such that in one or more orientations with respect to the simulated vehicle(s) 204.

Figure 3:
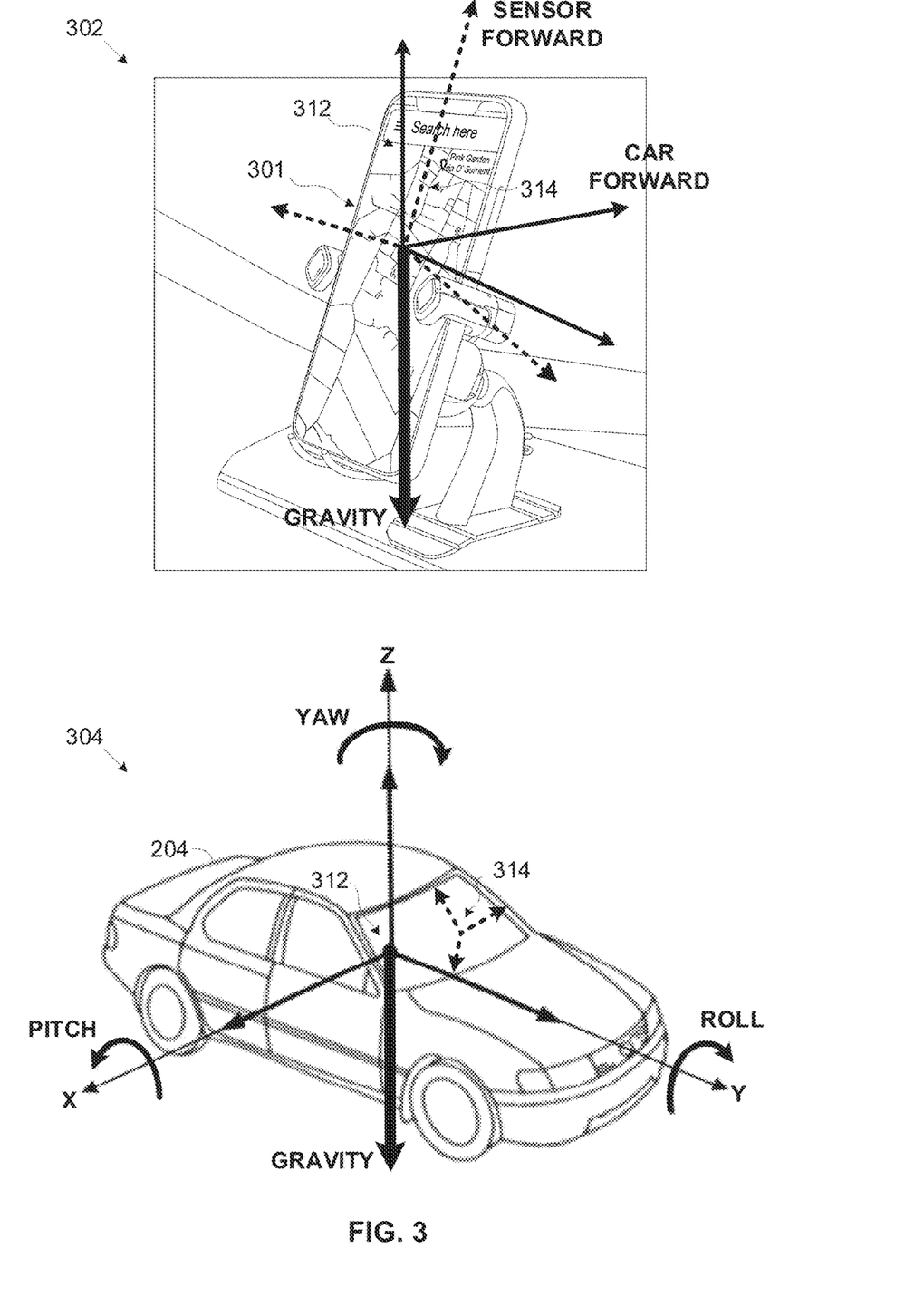
FIG. 3 illustrates a coordinate system of a mobile device comprising inertial sensors which is placed in a vehicle compared to vehicle's coordinate system, according to some embodiments of the present invention.

Reference is now made to FIG. 3, which illustrates a coordinate system of a mobile device comprising inertial sensors which is placed in a vehicle compared to vehicle's coordinate system, according to some embodiments of the present invention.

As seen in illustration 302, a mobile device 301, for example, a Smartphone comprising one or more inertial sensors such as the inertial sensor 202 may be placed in a vehicle such as the vehicle 204, for example, placed in a designated dashboard cradle.

Since the Smartphone 301 is independent of the vehicle 204 and unaligned with it, the inertial sensor(s) 202 of the Smartphone 301 may also be unaligned with the vehicle 204. This means that the inertial data captured (recorded) by the inertial sensor(s) 202 of the Smartphone 301 may not be aligned with respect to a first coordinate system 312 (solid line) of the vehicle 204. Rather, the captured inertial data may be measured in the sensor's frame of reference expressed by a second coordinate system 314 (dashed line) which is not aligned with the first coordinate system 312.

Illustration 304 shows misalignment between the frames of the first coordinate system 312 (solid line) of the vehicle 204, typically based on the body frame of the vehicle 204, and the second coordinate system 314 (dashed line) of the inertial sensor 202 typically aligned to the frame of the Smartphone 301. The misalignment of the second coordinate system 314 with respect to the first coordinate system 312 may be expressed, for example, by shifts in one or more orientation (mounting) angles of the inertial sensor 202, which is typically aligned with the Smartphone 301, for example, yaw, pitch, and/or roll.

As seen, the gravity force vector pointing down towards earth's mass center may be aligned with the first coordinate system 312 of the vehicle 204, serving as reference coordinate system, while the vehicle 204 is oriented at some roll and/or pitch angles with respect to the earth's center. Obviously, the gravity force vector may not be aligned with the first coordinate system 312 when the vehicle 204 is not horizontally oriented with the earth surface, i.e., having a certain non-zero pitch and/or roll, for example, moving up/down a slope, rolling to one side, and/or the like. One or more methods may be applied to derive the orientation angle, i.e., pitch and/or roll angles, of the vehicle 204, specifically orientation of the first coordinate system 312, with respect to the earth surface based on the gravity force vector.

Reference is made once again to FIG. 1 and FIG. 2.

Via the I/O interface 210, the training system 200 may receive inertial data recorded by one or more inertial sensors 202 located in one or more vehicles 204.

For example, inertial data captured by one or more real inertial sensors 202 during one or more trips of one or more real vehicles 202 may be collected by one or more data collection systems and delivered to the training system 200 via the network 206. In another example, the training system 200 may directly communicate, via the I/O interface 210, with one or more of the inertial sensor(s) 202 to obtain the inertial data they captured during one or more trips of the vehicle(s) 240. In another example, the inertial data captured by real inertial sensor(s) 202 during one or more trips of the vehicle(s) 204 may be stored in one or more portable storage media devices (e.g., USB memory stick, etc.) which may be attached to the I/O interface 210 such that the training system 200 may retrieve the stored inertial data. In another example, the training system 200 may communicate, via the network 206, with one or more of the simulation tools, software applications, and/or services to receive inertial data simulated for one or more inertial sensor(s) 202 during one or more simulated trips of one or more vehicles 204.

Optionally, the training system 200 may communicate with one or more remote network resources 208 over the network 206, via the I/O interface 210, for example, a database, a cloud service, and/or the like.

The processor(s) 212, homogenous or heterogeneous, may include one or more processing nodes and/or cores arranged for parallel processing, as clusters and/or as one or more multi core processor(s).

The storage 214 may include one or more non-transitory persistent storage devices, for example, a ROM, a Flash array, a Solid State Drive (SSD), a hard drive (HDD), and/or the like. The storage 214 may also include one or more volatile devices, for example, a RAM component, a cache, and/or the like. The storage 214 may further comprise one or more network storage devices, for example, a storage server, a Network Accessible Storage (NAS), a network drive, a database server and/or the like accessible through the I/O interface 210.

The processor(s) 212 may execute one or more software modules such as, for example, a process, a script, an application, an agent, a utility, a tool, an Operating System (OS), and/or the like each comprising a plurality of program instructions stored in a non-transitory medium (program store) such as the storage 214 and executed by one or more processors such as the processor(s) 212.

The processor(s) 212 may optionally further, integrate, utilize and/or facilitate one or more hardware elements (modules) integrated and/or utilized in the training system 200, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU), an Artificial Intelligence (AI) accelerator and/or the like.

The processor(s) 212 may therefore execute one or more functional modules implemented using one or more software modules, one or more of the hardware modules and/or combination thereof.

For example, the processor(s) 212 may execute a training engine 220 to execute the process 100 for training one or ML models 222 to estimate the orientation of inertial sensors 202 with respect to vehicle(s) 204 in which the inertial sensor(s) 202 are located.

It should be noted, that the process 100 and/or part thereof executed by the training engine 220 may be executed by the processor(s) 212 such that any one or more processors of the processor(s) 212 may execute the process 100 and/or part thereof or optionally not participate in execution of the process 100.

Optionally, the training system 200, specifically the training engine 220 may be utilized by one or more cloud computing services, platforms and/or infrastructures such as, for example, Infrastructure as a Service (IaaS), Platform as a Service (PaaS), Software as a Service (Saas) and/or the like provided by one or more vendors, for example, Google Cloud, Microsoft Azure, Amazon Web Service (AWS) and Elastic Compute Cloud (EC2), IBM Cloud, and/or the like.

As shown at 102, the process 100 starts with the training engine 220 receiving inertial data, for example, acceleration data, angular velocity data, and/or the like recorded by one or more inertial sensors 202 during a plurality of trips of one or more vehicles 204. The inertial data recorded by each inertial sensor 202 may further comprise ground truth orientation data indicative of orientation of the respective sensor 202 with respect to the vehicle 204, and/or with respect to earth surface.

The inertial data and/or part thereof may be expressed in one or more forms and/or formats. For example, the acceleration data may comprise a plurality of acceleration samples captured by an acceleration sensor 202 where each acceleration sample may be expressed by three acceleration components with respect to a reference coordinate system of the acceleration sensor 202. In another example, the angular velocity data may comprise a plurality of angular velocity samples captured by a gyroscope 202 where each angular velocity sample may be expressed by three angular velocity components with respect to a reference coordinate system of the gyroscope 202.

As described herein before, each inertial sensor 202 may be independent of the respective vehicle 204 in which they it is located such that the inertial sensor 202 is not aligned with the respective vehicle 204, specifically the coordinate system of the inertial sensor 202 is not aligned with the (reference) coordinate system of the vehicle 204.

The inertial sensor(s) 202 may be placed in the vehicle(s) 204 in one or more predefined orientations with respect to its respective vehicle 204. The predefined orientation of each inertial sensor 202 with respect its respective vehicle 204 may be defined with respect to the reference coordinate system of the respective vehicle 204, for example, a Cartesian coordinate system, a Euler coordinate system, and/or the like.

The term predefined in the context of the present disclosure is interpreted as known, meaning that the orientation of each inertial sensor 202 with respect to its respective vehicle 204 during each trip segment is known, specifically during the training phase of the ML model(s) 222.

There may be one or more predefined orientations. For example, multiple inertial sensors 202 located in a single vehicle 204 may each have a respective one of one or more different orientations with respect to the vehicle 204. In another example, one or more inertial sensors 202 located in a one or more vehicles 204 may have a respective one of one or more different orientations with respect to the vehicle 204 during different trips of the respective vehicle 204.

Each predefined orientation of each inertial sensor 202 may be defined by one or more orientation (mounting) attributes which aim to define and/or be used to determine a ground truth for the respective inertial sensor 202, specifically with respect to the respective vehicle 204 in which the respective inertial sensor 202 is located.

The orientation attributes of each predefined orientation may include one or more orientation (mounting) angles of the respective inertial sensor 202 with respect to the respective vehicle 204, specifically with respect to the reference coordinate system of the vehicle 204, for example, yaw, pitch, and/or roll.

Optionally, the orientation attributes of one or more predefined orientations of one or more inertial sensors 202 located in one or more vehicles 204 may further comprise and/or define a position of the respective inertial sensor 202 with respect to one or more reference points of the respective vehicle 204.

For example, the orientation attributes of a certain predefined orientation of a certain inertial sensor 202 located (deployed) in a certain vehicle 204 may define a position, for example, orientation, location, etc. of the certain inertial sensor 202 with respect to a reference point of the certain vehicle 204, for example, a lower left corner of the front shield of the certain vehicle 204. Since the position of the lower left corner of the vehicle's front shield is known, the orientation of the certain inertial sensor 202 with respect to the coordinate system of the certain vehicle 204 may be derived, computed, and/or otherwise determined.

Optionally, the orientation attributes of one or more predefined orientations of one or more inertial sensors 202 located in one or more vehicles 204 may further comprise and/or define a mounting arrangement of the respective inertial sensor 202 in the respective vehicle 204. The mounting arrangement may comprise, for example, rigid mounting, flexible mounting, loose placement, and/or the like which may dynamically affect the orientation of one or more inertial sensors 202 with respect to the vehicle 204 in which they are located.

For example, a certain mobile device, for example, a Smartphone having an integrated inertial sensor 202 may be placed in a rigid cradle that is rigidly fixed to a dashboard of a certain vehicle 204. In another example, the Smartphone having an integrated inertial sensor 202 may be placed in a cradle that is flexibly connected to the dashboard of the certain vehicle 204 via an at least partially flexible mounting element (e.g., arm, pole, etc.). As such, the Smartphone may slightly move and/or shift during one or more trips of the certain vehicle 204 which may change the orientation of the integrated inertial sensor 202 with respect to the certain vehicle 204.

The orientation attributes of each predefined orientation of each inertial sensor 202 which may be set, defined, measured, and/or derived for the respective predefined orientation of the respective inertial sensor 202 with respect to the vehicle 204 in which the respective inertial sensor 202 is located (deployed).

For example, assuming a certain inertial sensor 202 of a certain mobile device of a user is placed in a certain vehicle 204 in a certain orientation, the orientation angles of the certain predefined orientation which is known (and thus predefined) may be measured. In another example, assuming a certain inertial sensor 202 is simulated during a simulated trip of a certain vehicle 204, the orientation angles of the certain predefined orientation which is known (and thus predefined) may be received from the simulation tool, simulating application, and/or simulation environment. In another example, a certain inertial sensor 202 may be integrated in a mobile device, for example, a Smartphone which is rigidly mounted in a certain vehicle 204, for example, placed in a cradle rigidly fixed to the dashboard of the certain vehicle 204. In such case, the rigid mounting arrangement of the Smartphone reflecting and/or inducing the predefined orientation of the integrated inertial sensor 202 may be observed and recorded.

As described herein before, the trips of the vehicle(s) 204 may comprise one or more real trips conducted by one or more real vehicles 204 in which one or more real inertial sensors 202 are deployed to capture inertial data. In another example, one or more of the plurality of trips may be simulated trips simulated for one or more vehicles 204 where inertial data may be simulated for one or more inertial sensors 202 located in the vehicles 204 in one or more predefined orientations.

The inertial data may comprise a plurality of inertial data samples captured during each trip where each inertial data sample may comprise inertial data captured at a certain time during the trip. For example, each inertial data sample may comprise a certain number C of channels expressing the inertial state measured at a respective sampling time. The value of C may be, for example, six, where each inertial data sample captured by a respective sensor 202 comprises three acceleration components and three angular velocity components expressing acceleration and angular velocity with respect to the three axes of the reference coordinate system of the respective sensor 202.

Each sample may be therefore associated with a timestamp indicative of its capture time, and/or its order or sequential position among the plurality of inertial data samples captured during the respective trip. The timestamp may comprise, for example, an actual real time, an index, an incrementing counter, and/or the like.

The inertial data relating to each inertial sensor 202 may therefore include the inertial data samples captured and/or recorded by the respective inertial sensor 202, typically coupled with their timestamps, and one or more orientation attributes of the predefined orientation of the respective inertial sensor 202. Each of the inertial data samples may be also associated with orientation data indicative of the sensor(s) 202 with respect to the vehicle 204, and/or with respect to earth surface serving as ground truth. The orientation data may be defined by one or more of the orientation attributes of the predefined orientation, for example, a pitch angle, a roll angle, a yaw angle and/or the like.

Optionally, the inertial data and/or part thereof may be rotated, for example, by the training engine 220 and/or another processing element, module, and/or engine, to align one or more axes of the reference coordinate system (e.g., reference coordinate system 314) of one or more of the inertial sensors 202 with the gravity force vector.

Optionally, the inertial data and/or part thereof may be pre-processed, for example, by the training engine 220 and/or another processing element, module, and/or engine, to adjust one or more signal parameters of one or more of a plurality of inertial signals included in the inertial data, for example, an acceleration signal, an angular velocity signal, and/or the like. For example, one or more filters may be applied to the inertial data and/or part thereof to reduce noise in one or more of the inertial signals, remove high frequency effects to smooth the signal(s), and/or the like. In another example, the inertial data and/or part thereof may be preprocessed to reduce the samples in order to down sample one or more of the inertial signals and/or increase samples in order to up sample one or more of the inertial signals. In another example, the inertial data and/or part thereof may be preprocessed to remove, for example, subtract the gravity force vector from the one or more of the inertial signals.

As shown at 104, the training engine 220 may segment each of the plurality of trips to a plurality of trip segments. In particular, the training engine 220 may segment each trip to a plurality of time windows W each corresponding to a respective trip segment of the respective trip.

As such, each trip segment of each trip may be associated with part of the inertial data comprising inertial data samples captured by the inertial sensor(s) 202 during a corresponding time window W. The training engine 220 may identify the timing, order, and/or sequence of the inertial data samples according to their associated timestamp and may therefore associate each trip segment with the inertial data samples captured during the time window W corresponding to the respective trip segment.

The training engine 220 may apply one or more methods for segmenting the trips. For example, the training engine 220 may segment one or more of the trips to a plurality of time windows having a prescribed length, i.e., a prescribed time duration, for example, half a second, two seconds, five seconds, ten seconds, and/or the like. In another example, the training engine 220 may segment one or more of the trips to a plurality of trip segments having a prescribed length, i.e., a prescribed distance, for example, ten meters, fifty meters, hundred, meters, and/or the like. In another example, the training engine 220 may segment one or more of the trips to a plurality of trip segments according to the inertial data captured during the trip. For example, the training engine 220 may create a new trip segment every time a major change is detected in the inertial data, for example, an acceleration change exceeding a certain threshold, a yaw and/or pitch change exceeding a certain threshold, and/or the like.

As shown at 106, the training engine 220 may create a training dataset comprising a plurality of labeled training samples each corresponding to a respective one of the plurality of trip segments of the plurality of trips.

Specifically, each of the labeled training samples created by the training engine 220 may comprise a respective time-series vector comprising a plurality of inertial data samples recorded during the time window W of a respective one of the plurality of trip segments.

The training engine 220 may associate the time-series vector of each labeled training sample with a label reflecting ground truth orientation, i.e., the orientation of each inertial sensor 202 with respect to its respective vehicle 204 in (during) the respective trip segment. The label reflecting the predefined orientation of the respective inertial sensor 202 during the receptive trip segment may include one or more of the orientation attributes of the predefined orientation, for example, an orientation angle (e.g., yaw, pitch, roll), position with respect to one or more reference points, a mounting arrangement, and/or the like.

Optionally, one or more augmented training samples may be created, for example, by the training engine 220 and/or by one or more other processing elements, modules, and/or engines, to enhance the training dataset.

The augmented training samples may be created based on one or more of the training samples created based on the captured and/or simulated inertial data. For brevity, creating augmented training samples is described based on a single training sample, designated base training sample hereinafter and marked a_(not-aligned). Also, for brevity, while all manipulations described herein after are made for the time-series vector of the base training sample, the terms of the base training sample and its time-series vector may be used interchangeably herein.

First, a rotation matrix R may be computed for the base training sample. The rotation matrix R may be computed based on the orientation attributes of the predefined orientation of the respective sensor 202 which captured the inertial data samples used to create the time-series vector of the base training sample. For example, the rotation matrix R may represent a rotation by a series of roll, pitch and yaw angles representing the ground truth (GT) truth for the base training sample with respect to the coordinate system of the vehicle 204. The rotation matrix R may be therefore formulated by $[R(roll, pitch, yaw)_{GT}]$.

The unaligned base training sample a_(not-aligned), specifically the time-series vector of the base training sample may be then aligned with the coordinate system of the vehicle 204 to create a respective aligned base training sample, specifically an aligned time-series vector. Aligning the base training sample may be done by multiplying its time-series vector by a transpose of the rotation matrix R designated [R(roll, pitch, yaw)$_{GT}$] T where transpose means that each of the angles is rotated in the opposite direction as described in equation 1 below:

$$a\_(aligned)=[R(roll,pitch,yaw)_{GT}]^T a\_(not\text{-}aligned) \qquad \text{Equation 1:}$$

Since the time-series vector of the base training sample may comprise acceleration and angular velocity each having angle components, the multiplication operation may be performed separately for the angle components of the acceleration and the angle components of the angular velocity.

One or more augmented training samples a_(synth-rotated) may be then created based on the aligned base training sample a (aligned) by multiplying the aligned base training sample a (aligned) by one or more emulated orientation angles to create the one or more augmented training samples according to equation 2 below. The emulated orientation angles may comprise one or more of a pitch angle, a roll angle, and/or a yaw angle.

$$a\_(synth\text{-}rotated)=[R(roll,pitch,yaw)_{(synth\ GT)}]a\_(aligned) \qquad \text{Equation 2:}$$

Where (roll, pitch, yaw)$_{(synth\ GT)}$ represents the emulated orientation angles.

Optionally, one or more of the emulated orientation angles of one or more augmented training samples may be randomly selected from a certain range, for example, from one or more respective predefined ranges. For example, one or more of the emulated orientation angles, specifically, the pitch angle, the roll angle, and/or the yaw angle of one or more augmented training samples may be randomly selected from the respective predefined range according to a uniform probability distribution.

For example, assuming it is desired to train the ML model(s) 222 to distinguish between roll angles in a range of ±70 degrees. In such case, one or more emulated orientation angles may be selected in the range ±70 degrees and multiplied with the aligned base training sample a_(aligned), specifically with the roll component of the time-series vector of the aligned base training sample a_(aligned). In particular, the aligned time-series vector may be multiplied by a rotation matrix reflecting an emulated roll angle selected from the range 70 degrees. Similar procedure may be applied for creating augmented training samples based on emulated pitch and/or yaw angles. Moreover, rotation matrices created for emulated pitch, roll and/or yaw may be combined and applied one after the other to create augmented training samples emulating multiple emulated angles.

Each augmented training sample may be associated with a label reflecting the emulated orientation angles used to create the rotation matrix by which the aligned base training sample was multiplied to produce the respective augmented training sample.

The augmented training sample(s) may be then included in the training dataset to enhance the training dataset, and the enhanced training dataset may be used for further training one or more of the ML model(s) 222.

As shown at 108, using the training dataset comprising the plurality of labeled training samples, the training engine 220 may train one or more ML models 222 to estimate orientation of each inertial sensor 202 with respect to the vehicle 204 in which the inertial sensor 202 is located (placed, deployed, etc.).

In particular, the training engine 220 may train one or more ML models 222 to estimate orientation of each inertial sensor 202 with respect to the reference coordinate system of the respective vehicle 204 in which the respective inertial sensor 202 is located.

In particular, since the training samples are annotated with labels, the training engine 220 may apply supervised training for training the ML model(s) 222 as known in the art. For example, according a typical ML scheme, a cost function may be formulated such that an output of the ML model(s) 222 is optimized to converge to the ground truth of training samples with respect to the vehicle 204.

While the ML model(s) 222 may be trained using the time-series vectors of the training samples, optionally, the ML model(s) 222 may receive as input an array of features comprising time-series features derived from the original time-series vectors.

Optionally, the training engine 220 may split the training dataset into a plurality of sets which may be each used for a certain aspect of the training, for example, a train set for training the ML model(s) 222, a validation set for validating the ML model(s) 222, and a test set sets for testing the ML model(s) 222.

Moreover, the training engine 220 may split the training sets each comprising an exclusive group of labeled training samples selected from the plurality of labeled training samples of the training dataset such that the training samples of each set do no overlap with the training samples of another group. The exclusive and non-overlapping splitting of the training samples may significantly reduce and potentially prevent over-fitting of the ML model(s) 222. In addition, effective split of the training dataset may significantly improve performance of the trained ML model(s) 222 to estimate the orientation of the inertial sensor(s) 202 with respect to the vehicle 204, for example, accuracy, reliability, consistency, robustness, and/or the like.

As shown at 110, the training engine 220 may output the trained ML model(s) 222 for estimating the orientation of one or more inertial sensors 202 placed in one or more vehicles 204 with respect to the respective vehicle in order to align inertial data captured by the inertial sensor(s) 202 with respect to its respective vehicle 204.

For example, the training engine 220 may provide the trained ML model(s) 222 to one or more inertial data alignment systems, devices, and/or services deployed for aligning the inertial data captured by one or more inertial sensors such as the inertial sensors 202 located in one or more vehicles 204, specifically inertial sensors 202 independent of the vehicle 204 in which they are located, with the respective vehicle 204. Specifically, the inertial data alignment systems may be adapted for aligning the inertial data captured by the independent (unaligned) inertial sensor(s) 202 with the coordinate system of the respective vehicle 204.

The aligned inertial data may be then used by one or more systems configured to execute one or more applications relating to the vehicle 204, for example, an automated driving system, a navigation system, a maintenance system, and/or the like.

The training engine 220 may output the trained ML model(s) 222, for example, by transmitting the ML model(s) 222 to one or more inertial data alignment systems over the network 206 via the I/O interface 210. In another example, the training engine 220 may store the trained ML model(s) 222 in one or more portable storage media devices attachable to the I/O interface 210. The portable storage media device(s) may be then detached and attached to one or more inertial data alignment systems which may load the stored ML model(s) 222.

Figure 4:
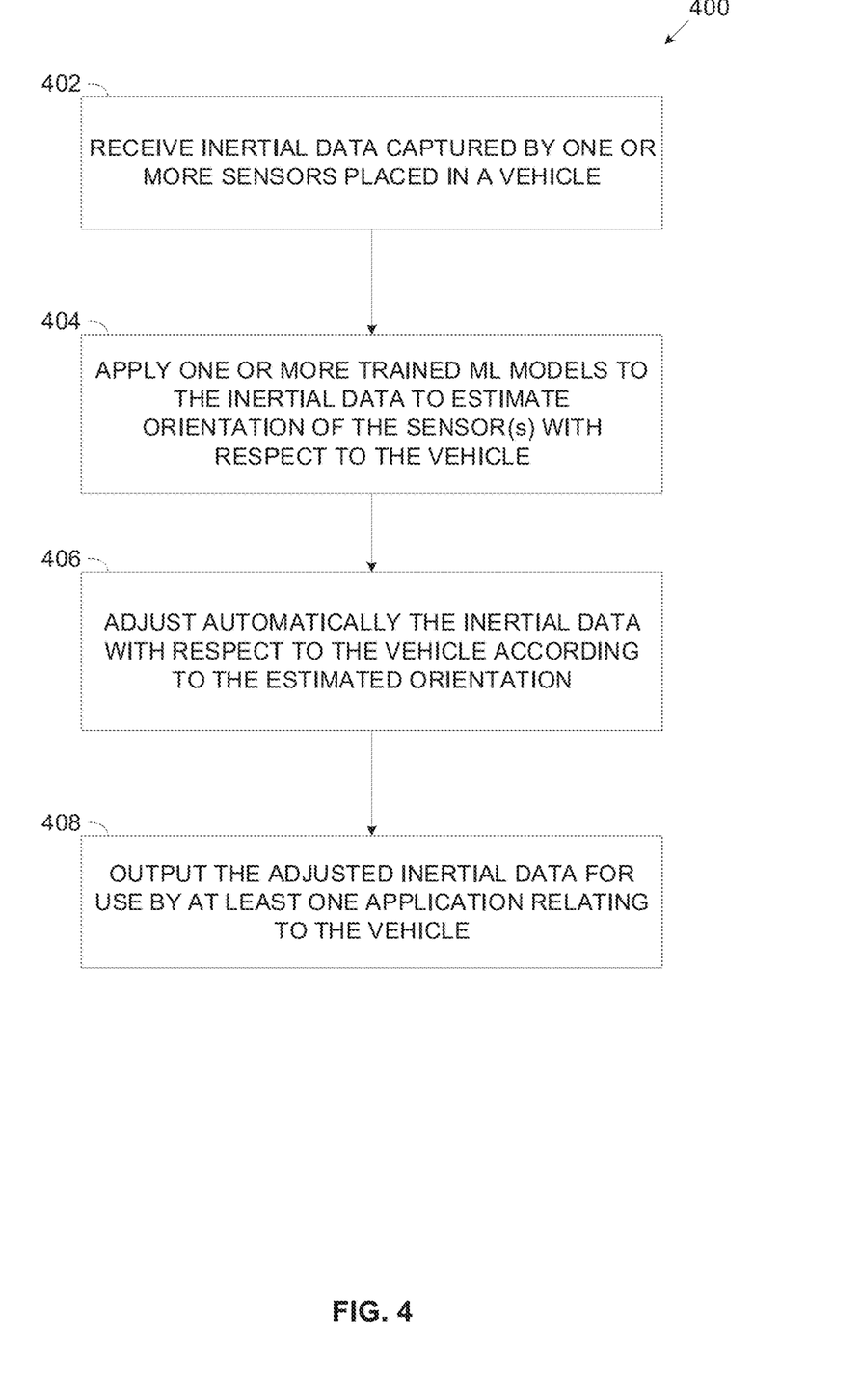
FIG. 4 is a flowchart of an exemplary process of automatically aligning inertial data captured by sensors placed in a vehicle with the vehicle's coordinate system using one or more trained ML models, according to some embodiments of the present invention.

Reference is now made to FIG. 4, which is a flowchart of an exemplary process of automatically aligning inertial data captured by sensors placed in a vehicle with the vehicle's coordinate system using one or more trained ML models, according to some embodiments of the present invention.

Figure 5:
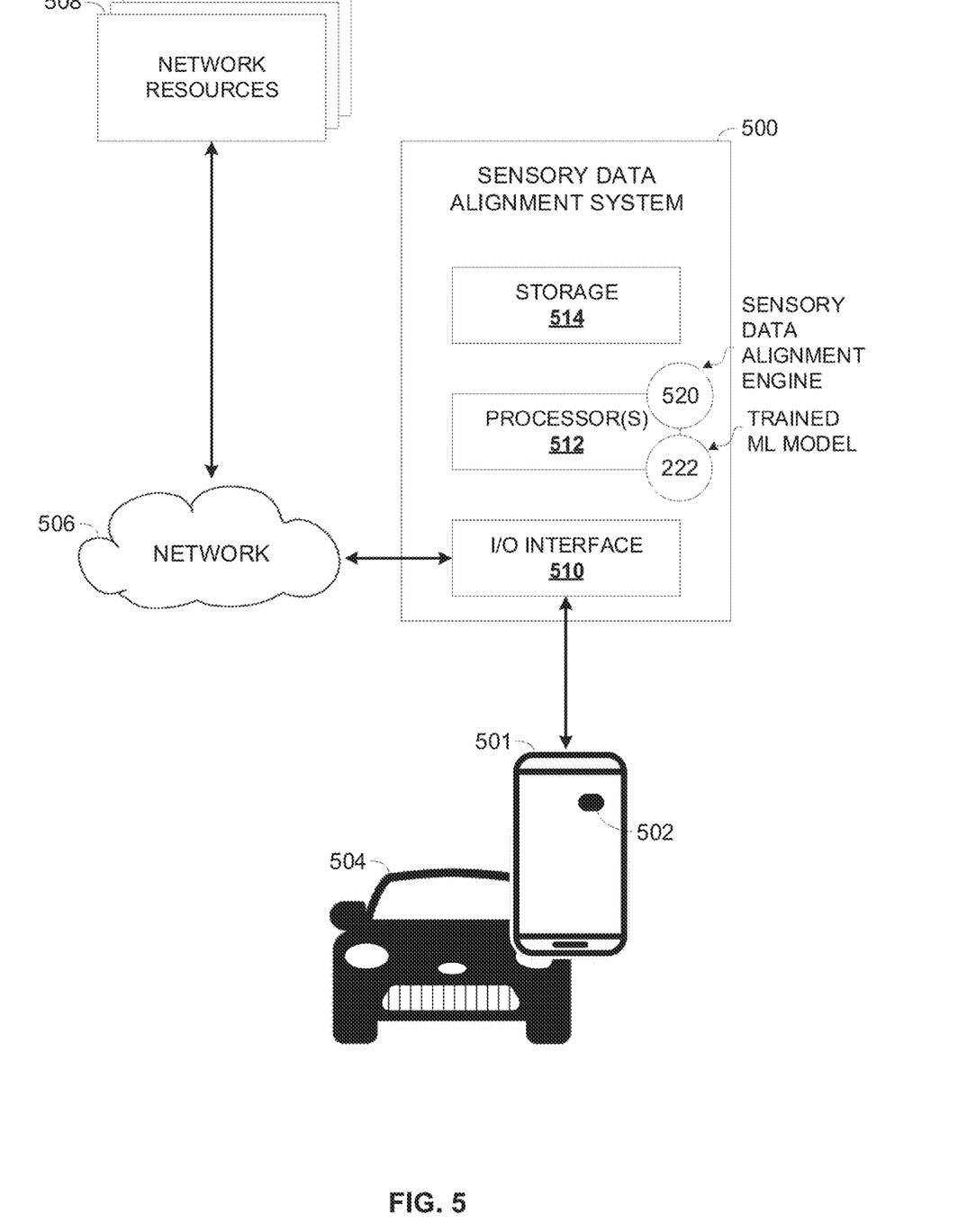
FIG. 5 is a schematic illustration of an exemplary system for automatically aligning inertial data captured by sensors placed in a vehicle with the vehicle's coordinate system using one or more trained ML models, according to some embodiments of the present invention, according to some embodiments of the present invention.

Reference is also made to FIG. 5, which is a schematic illustration of an exemplary system for automatically aligning inertial data captured by sensors placed in a vehicle with the vehicle's coordinate system using one or more trained ML models, according to some embodiments of the present invention.

An exemplary process 400 may be executed by an exemplary sensory data alignment system 500 to adjust inertial data captured by one or more sensors 502 such as the sensors 202 placed in one or more dynamic vehicle 504, for example, a car, a truck, a bus, a motorcycle, a bicycle, and/or the like.

As described for the inertial sensors 202, the inertial sensor(s) 502 may be typically integrated in one or more mobile devices 501 such as the mobile device 201, for example, a mobile, device associated with a user located in the vehicle, an IoT device, a vehicular system, a monitoring device, and/or the like which is carried, held, placed, deployed, and/or mounted in an arbitrary location and/or orientation unaligned with the vehicle 504.

For brevity, the process 400 and the system 500 are presented and described for aligning inertial data captured by sensors 502 located in a single vehicle 504. This, however, should not be construed as limiting since the process 400 may be repeated, duplicated, and expanded for aligning inertial data captured by sensors 502 located in a single vehicle 504.

Moreover, while the vehicle 504 may typically relate to ground vehicles, embodiments described herein may be expanded, using the same systems and methods, for estimating orientation of inertial sensors 502 located in one or more other vehicles 504, for example, an aerial vehicle, a naval vehicle, an agricultural dynamic machine, and/or the like.

The inertial sensor(s) 502, for example, an accelerometer, a gyroscope, a magnetometer, an IMU, and/or the like may be independent of the vehicle 504 in which it is located, meaning that a reference coordinate system of the sensor(s) 502 may not be aligned with a reference coordinate system of the vehicle 504.

For example, one or more inertial sensors 502 may be integrated in one or more mobile devices, for example, a Smartphone, a Smart watch, a wearable device, and/or the like carried, held, worn and/or used by one or more users (e.g., driver, passenger, commuter, etc.) riding in a vehicle 204. In another example, one or more inertial sensors 502 may be included in one or more vehicular systems deployed in a vehicle 504 but not rigidly fixed to the vehicle 504, at least not according to known mounting attributes, for example, a portable navigation system, an accident detection system mounted on a dashboard of a vehicle 504, and/or the like. In another example, one or more inertial sensors 502 may be included and/or available in one or more IoT devices located, deployed, and/or placed in a vehicle 504 but not rigidly fixed to the vehicle 504, at least not according to known mounting attributes, for example, a communication device, a telemetry device, and/or the like. In another example, one or more inertial sensors 502 may be included and/or available in one or more monitoring devices located, deployed, and/or placed in a vehicle 504 without rigid fixing to the vehicle 504, for example, a child safety system, and/or the like.

As such, the inertial sensor(s) 502 may not be aligned with the vehicle 204, i.e., the reference coordinate system of each inertial sensor 502 may be unaligned with the reference coordinate system of the vehicle 504 in which the respective sensor is located.

The sensory data alignment system 500, for example, a device, a processing node, a computer, and/or the like may comprise an I/O interface 510 such as the I/O interface 210, a processor(s) 512 such as the processor(s) 212 for executing the process 400, and a storage 514 such as the storage 214 for storing data and/or code (program store).

The I/O interface 510 may include one or more wired and/or wireless I/O interfaces as described for the I/O interface 210, and optionally comprising also one or more network adapters, interfaces, ports, and/or links for connecting to a network 506 such as the network 206 comprising one or more wired and/or wireless networks.

Via the I/O interface 510, the sensory data alignment system 500 may receive inertial data captured by the sensor(s) 502. For example, the training system 200 may communicate, via the I/O interface 510, with one or more inertial sensor(s) 502 to receive their captured inertial data. In another example, the training system 200 may communicate, via the I/O interface 510, with one or more data collection systems adapted to collect the inertial data captured by the sensor(s) 502 in order to obtain the inertial data.

Optionally, the sensory data alignment system 500 may communicate with one or more remote network resources 508 over the network 506, via the I/O interface 510, for example, a database, a cloud service, and/or the like. For example, the sensory data alignment system 500 may communicate with a remote server 508 to obtain one or more ML models such as the ML model 222 trained to estimate orientation of one or more of the sensor(s) 502 with respect to the vehicle 504.

As described for the processor(s) 212, the processor(s) 512 homogenous or heterogeneous, may include one or more processing nodes and/or cores arranged for parallel processing, as clusters and/or as one or more multi core processor(s). The storage 514 may include one or more non-transitory persistent storage devices, for example, a ROM, a Flash array, an SSD, an HDD, and/or the like and/or one or more volatile memory devices such as, for example, a RAM component, a cache, and/or the like.

The processor(s) 512 may execute one or more software modules each comprising a plurality of program instructions stored in a non-transitory medium (program store) such as the storage 514 and executed by one or more processors such as the processor(s) 512.

The processor(s) 512 may optionally further, integrate, utilize and/or facilitate one or more hardware elements (modules) integrated and/or utilized in the sensory data alignment system 500, for example, a circuit, a component, an IC, an ASIC, an FPGA, a DSP, a GPU, an AI accelerator and/or the like.

The processor(s) 212 may therefore execute one or more functional modules implemented using one or more software modules, one or more of the hardware modules and/or combination thereof. For example, the processor(s) 212 may execute a sensory data alignment engine 520 for executing the process 400 to align inertial data captured by the sensor(s) 202 with the reference coordinate system of the vehicle 504. In another example, the processor(s) 212 may execute one or more ML models 222 trained, as described in process 100, to estimate orientation of the sensor(s) 502 with respect to the vehicle 504 for aligning the inertial data captured by the sensor(s) 202 with the reference coordinate system of the vehicle 504.

It should be noted, that the process 400 and/or part thereof executed by the sensory data alignment engine 520 may be executed by the processor(s) 512 such that any one or more processors of the processor(s) 512 may execute the process 400 and/or part thereof or optionally not participate in execution of the process 400.

Optionally, the sensory data alignment system 500 may be integrated in one or more computing devices, systems, and/or platforms of the vehicle 504, for example, an Electronic Control Unit (ECU) of the vehicle 504, a ventral computing unit of the vehicle 504, an add-on computing unit deployed in the vehicle 504, and/or the like.

Optionally, the sensory data alignment system 500 may be utilized by one or more remote servers, computing nodes, cloud services and/or the like which may execute the sensory data alignment engine 520 and/or the trained ML model(s) 222. In such deployments, the remote sensory data alignment system 500 may communicate with the vehicle 504, specifically with a local agent executed by one or more processing units of the vehicle 504, to obtain the inertial data captured by the sensor(s) 502 deployed in the vehicle 504.

The process 400 may be invoked, initiated and/or executed according to one or more operation modes. For example, the process 400 may be initiated at the start of each trip of the vehicle 504, i.e., when the vehicle 504 is ignited and starts moving. In another example, the process 400 may be invoked periodically during one or more trips of the vehicle 504. In another example, the process 400 may be triggered, i.e., invoked on demand, by one or more parties, for example, a computing unit of the vehicle 504 (e.g., ECU), a user of the vehicle 504 (e.g., driver, passenger, etc.), a remote network resource 208, and/or the like.

As shown at 402, the process 400 starts with the sensory data alignment engine 520 receiving inertial data, for example, acceleration, angular velocity data, which may be expressed in angle components (e.g., yaw, pitch, roll), absolute direction (e.g., north pole), and/or the like captured by one or more inertial sensors 502 deployed independently in the vehicles 504.

Optionally, the inertial data and/or part thereof may be rotated, for example, by the sensory data alignment engine 520 and/or another processing element, module, and/or engine, to align one or more axes of the reference coordinate system of one or more of the inertial sensors 502 with the gravity force vector.

Optionally, the inertial data and/or part thereof may be pre-processed, for example, by the sensory data alignment engine 520 and/or another processing element, module, and/or engine, to adjust one or more signal parameters of one or more of a plurality of inertial signals included in the inertial data, for example, an acceleration signal, an angular velocity signal, and/or the like.

As shown at 404, the sensory data alignment engine 520 may apply the ML model(s) 222 to the captured inertial data in order to estimate orientation of each of the sensor(s) 502 with respect to the vehicle 504, specifically in order to estimate orientation of the coordinate system of each of the sensor(s) 502 with respect to the reference coordinate system of the vehicle 504.

In particular, the sensory data alignment engine 520 may apply the ML model(s) 222 to the analyze one or more streams of incoming inertial data captured by the sensor(s) 502 during one or more time intervals having a certain duration, for example, thirty seconds, one minute, three minutes, five minutes, ten minutes, and/or the like.

Optionally, the sensory data alignment engine 520 may collect a plurality of outputs of the ML model(s) 222, i.e., a plurality of orientation estimations made by the ML model(s) 222 for one or more streams (bulks) of inertial data captured by the sensor(s) 502. The sensory data alignment engine 520 may thus form an array of estimations and may apply one or more logic, and/or processing algorithms to improve accuracy, stability, reliability, and/or integrity of the estimated orientation of the sensor(s) 502 with respect to the vehicle 504. For example, the sensory data alignment engine 520 may apply a moving average over the outputs of the ML model(s) 222 to produce a smoother estimated orientation and avoid sharp high frequency changes and/or alterations in the output of the ML model(s) 222.

As shown at 406, the sensory data alignment engine 520 may adjust, automatically in real-time, the inertial data according to the orientation of the inertial sensor(s) estimated by the ML model(s) 222.

This means that the sensory data alignment engine 520 adjust the inertial data which is referenced to the reference coordinate system of the sensor(s) 502 to be referenced to the coordinate system of the vehicle 504 thus aligning the inertial data with the reference coordinate system of the vehicle 504.

Optionally, responsive to detection of a change in the estimated orientation of one or more of the inertial sensor(s) 502, the sensory data alignment engine 520 may dynamically adjust the inertial data captured by the respective sensor 502 according to an estimated new (different) orientation of the respective sensor 502 with respect to the orientation of the vehicle 504.

Such changes in the orientation of the sensor(s) 502 may result, for example, from a change in the location, position, and/or orientation of one or more of the sensor(s) 502 during the trip. For example, assuming one or more of the sensor(s) 502 are integrated in a mobile device used by a user of the vehicle 504, for example, a Smartphone. Further assuming the Smartphone is placed in a cradle mounted on the dashboard of the vehicle 504. In such case, when the user touches the Smartphone, the orientation and/or position of the Smartphone may change which may change the orientation of the integrated sensor(s) 502. In another example, when the vehicle 504 stops (e.g., waiting at a red light, parking, etc.), the user may take the Smartphone out of the cradle thus changing the orientation of the integrated sensor(s) 502. In another example, assuming one or more of the sensor(s) 502 are integrated in tablet and/or Smartphone placed in the vehicle 504 on the passenger seat. In such case, the tablet and/or Smartphone may move and/or shift during the trip due to a turn, a brake, an acceleration and/or the like of the vehicle 504. Such a move or shift of the tablet and/or Smartphone may change the orientation of their integrated sensor(s) 502.

The sensory data alignment engine 520 may detect such changes in the orientation of the sensor(s) 502 by monitoring and analyzing the output of the ML model(s) 222, i.e., the estimated sensor(s)' orientation. For example, an outlier and/or a sharp change in the output of the ML model(s) 222 may be indicative of a modification to the installation, mounting, and/or placement of the sensor(s) 502.

As shown at 408, the sensory data alignment engine 520 may output, transmit, deliver, and/or otherwise provide the adjusted inertial data to one or more systems adapted to use the adjusted inertial data for one or more vehicular applications relating to the vehicle 504.

For example, the sensory data alignment engine 520 may provide the adjusted inertial data to one or more automated driving systems of the vehicle 504 adapted to control driving, movement, and/or steering of the vehicle 504, for example, an autonomous driving system, a cruise control system, a lane departure monitoring and/or warning system, a safety system, and/or the like.

In another example, the sensory data alignment engine 520 may provide the adjusted inertial data to one or more navigation and/or tracking systems of the vehicle 504 adapted to, for example, compute navigation paths for the vehicle 504, track movement, location, and/or position of the vehicle 504, and/or the like.

In another example, the sensory data alignment engine 520 may provide the adjusted inertial data to one or more maintenance and/or monitoring systems of the vehicle 504 adapted to, for example, track dynamics of the vehicle 504 for wear and tear monitoring, monitor and/or control energy consumption (e.g., fuel, electric energy, etc.), compute maintenance sessions schedule, and/or the like.

In addition to the adjusted inertial data, the sensory data alignment engine 520 may also provide (e.g., output, transmit, deliver) the orientation of each of the sensor(s) 502 with respect to the vehicle 504 one or more of the vehicular systems. For example, the sensory data alignment engine 520 may output the orientation angle of each sensor 502 with respect to the reference coordinate system of the vehicle 504, for example, yaw, pitch, and/or roll. One or more of the vehicular systems may use the orientation angle for determining alignment of the sensor(s) 502 with respect to the vehicle 504 and use the adjusted inertial data accordingly.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms inertial data, and inertial sensor are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of training machine learning (ML) models for aligning inertial data captured by inertial sensors located in dynamic vehicles, comprising:
   using at least one processor for:
      receiving inertial data recorded in a plurality of trips of at least one vehicle, the inertial data is recorded using at least one inertial sensor placed in the at least one vehicle in at least one predefined orientation with respect to the at least one vehicle;
      dividing each of the plurality of trips to a plurality of trip segments, wherein said dividing is conducted according to a member of a group consisting of: (1) a predefined time duration for a trip segment, (2) a predefined distance said at least one vehicle has driven during a trip segment and (3) creating a new trip segment whenever a change in said inertial data passes a predefined threshold value;
      creating a training dataset comprising a plurality of labeled training samples, each of the plurality of labeled training samples is a time-series vector comprising a plurality of inertial data samples recorded during a time window of a respective one of the plurality of trip segments and associated with a label reflecting the at least one predefined orientation of the at least one inertial sensor during a respective trip segment;
      training at least one ML model using the plurality of labeled training samples to estimate orientation of at least one inertial sensor with respect to at least one vehicle;
      outputting the at least one trained ML model for estimating orientation of the at least one inertial sensor placed in the at least one vehicle with respect to the at least one vehicle for aligning inertial data captured by the at least one inertial sensor with respect to the at least one vehicle; and
      creating at least one augmented training sample to enhance the training dataset by:
         computing a rotation matrix for at least one of the plurality of training samples with respect to the at least one vehicle according to the at least one predefined orientation extracted from the label of the at least one training sample,
         multiplying the time-series vector of the at least one training sample by the rotation matrix to create a respective at least one aligned training sample aligned with respect to the at least one vehicle, and
         creating the at least one augmented training sample by:
            multiplying the at least one aligned training sample by at least one emulated orientation angle to create the at least one augmented training sample, and
            associating the at least one augmented training sample with a label reflecting the at least one emulated orientation angle,
         including the at least one augmented training sample in the training dataset to enhance the training dataset, and
      using the enhanced training dataset for further training the at least one ML model.

2. The method of claim 1, wherein the orientation of the at least one inertial sensor with respect to the at least one vehicle is defined with respect to a reference coordinate system of the at least one vehicle.

3. The method of claim 1, wherein the at least one predefined orientation of the at least one inertial sensor further comprises a position of the at least one inertial sensor with respect to at least one reference point of the at least one vehicle.

4. The method of claim 1, wherein the at least one predefined orientation of the at least one inertial sensor further comprises a mounting arrangement of the at least one inertial sensor in the at least one vehicle.

5. The method of claim 1, wherein each of the plurality of trips is a member of a group consisting of: a real trip conducted by the at least one vehicle, a simulated trip simulated for the at least one vehicle, and a simulated trip simulated for the at least one inertial sensor.

6. The method of claim 1, wherein the inertial data is rotated to align at least one axis of a reference coordinate system of the at least one sensor with the gravity force vector.

7. The method of claim 1, wherein the at least one emulated orientation angle comprises at least one of: a pitch angle, a roll angle, and a yaw angle, at least one of the pitch angle, the roll angle, and the yaw angle is randomly selected from a respective predefined range.

8. The method of claim 7, wherein at least one of the pitch angle, the roll angle, and the yaw angle is randomly selected from the respective predefined range according to a uniform probability distribution.

9. The method of claim 1, wherein the plurality of labeled training samples are split into a train set, a validation set, and a test set sets each comprising an exclusive group of labeled training samples selected from the plurality of labeled training samples.

10. The method of claim 1, wherein at least part of the inertial data is pre-processed to adjust at least one signal parameter of at least one of a plurality of inertial signals included in the inertial data.

11. A system for training machine learning models for aligning inertial data captured by sensors located in dynamic vehicles, comprising:
    at least one processor executing a code, the code comprising:
        code instructions to receive inertial data recorded in a plurality of trips of at least one vehicle, the inertial data is recorded using at least one inertial sensor placed in the at least one vehicle in at least one predefined orientation with respect to the at least one vehicle;
        code instructions to divide each of the plurality of trips to a plurality of trip segments each corresponding to a respective one of a plurality of time windows, wherein said dividing is conducted according to a member of a group consisting of: (1) a predefined time duration for a trip segment, (2) a predefined distance said at least one vehicle has driven during a trip segment and (3) creating a new trip segment whenever a change in said inertial data passes a predefined threshold value;
        code instructions to create a training dataset comprising a plurality of labeled training samples, each of the plurality of labeled training samples is a time-series vector comprising a plurality of inertial data samples recorded during a time window of a respective one of the plurality of trip segments and associated with a label reflecting the at least one predefined orientation of the at least one inertial sensor during a respective trip segment;
        code instructions to train at least one ML model using the plurality of labeled training samples to estimate orientation of at least one inertial sensor with respect to at least one vehicle;
        code instructions to output the at least one trained ML model for estimating orientation of the at least one inertial sensor placed in the at least one vehicle with respect to the at least one vehicle for aligning inertial data captured by the at least one inertial sensor with respect to the at least one vehicle; and
        code instruction to create at least one augmented training sample to enhance the training dataset by:
            computing a rotation matrix for at least one of the plurality of training samples with respect to the at least one vehicle according to the at least one predefined orientation extracted from the label of the at least one training sample,
            multiplying the time-series vector of the at least one training sample by the rotation matrix to create a respective at least one aligned training sample aligned with respect to the at least one vehicle, and
            creating the at least one augmented training sample by:
                multiplying the at least one aligned training sample by at least one emulated orientation angle to create the at least one augmented training sample, and
                associating the at least one augmented training sample with a label reflecting the at least one emulated orientation angle,
            including the at least one augmented training sample in the training dataset to enhance the training dataset, and
        code instructions to use the enhanced training dataset for further training the at least one ML model.

12. The method of claim 1, wherein said dividing is conducted according to a predefined time duration for a trip segment.

13. The method of claim 1, wherein said dividing is conducted according to a predefined distance said at least one vehicle has driven during a trip segment.

14. The method of claim 1, wherein said dividing is conducted by creating a new trip segment whenever a change in said inertial data passes a predefined threshold value.

* * * * *